United States Patent [19]
Morrow et al.

[11] Patent Number: 5,524,445
[45] Date of Patent: *Jun. 11, 1996

[54] REFRIGERANT LEAK DETECTOR SYSTEM

[75] Inventors: Gordon R. Morrow, Houston; Coy M. White, Spring, both of Tex.

[73] Assignee: Texas Medical Center Central Heating and Cooling Cooperative Association, Houston, Tex.

[ * ] Notice: The term of this patent shall not extend beyond the expiration date of Pat. No. 5,351,500.

[21] Appl. No.: 414,264

[22] Filed: Mar. 31, 1995

Related U.S. Application Data

[63] Continuation of Ser. No. 161,959, filed as PCT/US94/13479, Nov. 21, 1994., Pat. No. 5,351,500.

[51] Int. Cl.⁶ .............................. F28F 11/00; F25B 49/02
[52] U.S. Cl. ................................ 62/129; 62/127; 165/70
[58] Field of Search ............................. 62/125, 126, 127, 62/129, 85, 195, 475; 165/11.1, 70

[56] References Cited

U.S. PATENT DOCUMENTS

| | | | |
|---|---|---|---|
| 4,138,856 | 2/1979 | Orlowski | 62/181 |
| 4,316,364 | 2/1982 | Spaschus | 62/129 |
| 4,803,843 | 2/1989 | Otto | 62/127 X |
| 4,862,698 | 9/1989 | Morgan et al. | 62/77 |
| 4,910,463 | 3/1990 | Williams | 324/468 |
| 5,071,768 | 12/1991 | Klodowski | 62/129 X |
| 5,228,304 | 7/1993 | Ryan | 62/129 |
| 5,351,500 | 10/1994 | Morrow | 62/129 |

*Primary Examiner*—Harry B. Tanner
*Attorney, Agent, or Firm*—Fulbright & Jaworski

[57] ABSTRACT

A refrigerant leak detection apparatus and method for testing for leaking refrigerant within a heat exchanging fluid, particularly for testing for leaking refrigerant in a chiller system comprising heat exchangers.

12 Claims, 5 Drawing Sheets

REFRIGERANT LEAK DETECTOR SYSTEM

BACKGROUND OF THE INVENTION

This is a continuation-in-part application of International Application No. PCT/US94/13479, filed Nov. 21, 1994, designating the United States, which in turn claims priority from and is a continuation of U.S. patent application Ser. No. 08/161,959, filed Dec. 3, 1993, and issued as U.S. Pat. No. 5,351,500 on Oct. 4, 1994.

Chillers comprising an evaporator and a condenser have long been known. Typically, the condenser and evaporator will each comprise heat exchangers that have many smaller tubes that pass through a larger tube, or shell. Also typically, a refrigerant having a suitably low specific heat and vapor pressure, such as fluorocarbon, is passed through the shell while a heat exchanging liquid having a relatively high specific heat and vapor pressure, such as water, is passed through the smaller tubes. So passing through the heat exchanger, heat is transferred between the refrigerant and the heat exchanging liquid.

In the evaporator, heat is extracted from the heat exchanging liquid as the refrigerant is heated and, thus, gasified. The resulting cold heat exchanging liquid is routed for air conditioning, industrial cooling, and the like. The resulting gasified refrigerant is routed to a compressor where it is compressed to increase its pressure. From the compressor, the pressurized refrigerant is routed to the condenser. In the condenser, the pressurized refrigerant gas is passed through the shell of the heat exchanger having smaller tubes through which a cooling heat exchanging liquid is passed. So passing through the heat exchanger, the refrigerant is cooled and the heat exchanging liquid is heated.

At the increased pressure of the condenser and the lower temperature, the refrigerant changes phase from gas back to liquid. The liquefied refrigerant is routed back to the evaporator through a pressure valve. As the pressure is lowered, the refrigerant becomes again cold. The cold, liquid refrigerant is again used to cool the heat exchanging liquid in the evaporator, and the cycle is repeated.

One of the major problems with chillers of the above kind is that leaks develop in the heat exchangers. Such leaks typically arise from internal and external corrosion and cracking, which is caused by the high pressures, extreme temperatures, and the caustic nature of the refrigerants and heat exchanging liquids. Leaks are very undesirable, because they decrease the efficiency of the chillers and cause wasting of refrigerant. Furthermore, chillers often use Freon, a refrigerant, the release of which into the environment is now known to cause damage to the Earth's ozone layer. As the dangers of leaking Freon have been discovered, it has become increasingly important to monitor and to prevent such leakage.

Detecting Freon leaks in chillers is not practicable using the prior art. Such leaks are usually small, and the Freon is discreetly carried from the chiller by the heat exchanging fluid that exits the heat exchangers.

U.S. Pat. No. 4,910,463 to Williams discloses an apparatus for detecting levels of halogen gases, such as Freon, in a confined space. Upon detecting a pre-determined concentration of halogen gas, the apparatus can sound an alarm. The apparatus is not capable of continuously detecting refrigerant in the flow of a heat exchanging liquid such as water.

U.S. Pat. No. 4,862,698 to Morgan et al. discloses a method and apparatus to detect refrigerant leaks by increasing the temperature of the refrigerant, thereby increasing the refrigerant pressure and making it easier to detect refrigerant leaks. This method is not applicable to the typical chiller refrigeration system because raising the refrigerant temperature would adversely affect the performance of the chiller while it is on-line. This method would work only if the chiller system is off-line and the refrigerant temperature is stabilized. In addition, this invention does not address a method for detecting the existence of refrigerant in the heat exchange fluid.

U.S. Pat. No. 5,228,304 to Ryan discloses a method and apparatus for determining the amount of refrigerant in a closed system by monitoring the liquid refrigerant level in the system utilizing a float apparatus. This is not applicable to monitoring the refrigerant levels in chiller refrigerant systems because the liquid refrigerant levels in chiller systems fluctuate drastically depending on the heat load on the heat exchanger. This method does not address a direct method for detecting the existence of refrigerant in the heat exchange fluid.

None of the foregoing prior art teaches how to test for refrigerant in a flow of heat exchanging fluid, such as water, in a chiller.

SUMMARY OF THE INVENTION

The present invention is directed toward providing a method and apparatus to detect the existence of refrigeration leaks in the heat exchangers of refrigeration systems which utilize a fluid heat exchange medium as part of the refrigeration process to either lower the refrigeration temperature or raise the refrigeration temperature, of which chillers are a typical example. Accordingly, it is an object of this invention to provide a means whereby refrigerant leaks can be readily detected and will reliably determine that refrigerant has leaked into the heat exchange fluid.

It is another object of the present invention to include a means by which Freon vapors can be detected either with hand held detection devices for periodical checking or continuous monitoring.

It is another object of the present invention to be able to monitor the refrigeration system for leaks in the heat exchanger while the system is either operating thereby allowing the system to perform its cooling function without interruption or while the system is off-line and not operating.

It is still another object of the present invention to be able to monitor the refrigeration system without discarding any of the heat exchange fluid or preventing the fluid from leaking into the surrounding environment.

Still another objective of the present invention is to provide a means by which a refrigerant leak detection system can be readily installed on either existing refrigerant systems or new refrigerant systems without affecting the performance of the system.

It is another objective of this invention to provide a refrigerant leak detection system, which can initiate and maintain an electrical circuit to an audible and/or visual alarm during continued operation of the refrigeration system when a refrigerant leak has been detected.

It is an objective of this invention to provide a method and apparatus to control the liquid level in the sample chamber, utilizing readily available control technology and compressed air, thereby making the system perform its required function as inexpensively as is practical.

It is an objective of this invention to provide an apparatus made of readily available materials.

It is an objective of this invention to provide a method and apparatus to arrange the components of this invention to provide maximum performance of the refrigerant leak detection system.

To achieve the foregoing objects, there is disclosed an apparatus for detecting refrigerant leaks in a refrigeration system having a refrigerant and a heat exchanging fluid comprising a heat exchanger having a conduit therethrough for transporting a heat exchanging liquid; a stand pipe in communication with the conduit; means for maintaining a gas pocket in the stand pipe; and means for detecting gasified refrigerant in a gas pocket within the stand pipe. The apparatus may include a sample tube disposed within the stand pipe, the sample tube in communication with the gasified refrigerant detector means.

The means for maintaining a gas pocket in the stand pipe may further comprise means for detecting a volume of gas in the stand pipe and means for injecting gas into the stand pipe. The means for detecting a volume of gas in the stand pipe may further comprise a fluid-level detecting means. The fluid-level detecting means may further comprise a plurality of float switches. The foregoing apparatus may further comprise means for mixing a volume of air in the stand pipe. The mixing means may further comprise means for injecting air into the stand pipe below the surface of any liquid in the stand pipe.

Also to achieve the foregoing objects, there is disclosed an apparatus for detecting a halogen gas within a liquid flowing through a conduit comprising a conduit for transporting a liquid containing halogen gas; a stand pipe in communication with the conduit; means for maintaining a gas pocket in the stand pipe; and means for detecting halogen gas in a gas pocket within the stand pipe.

Also to achieve the foregoing objects, there is disclosed a method for detecting gasified refrigerant within a conduit carrying a liquid comprising the steps of exposing a liquid in a conduit to a stand pipe in communication with the conduit; establishing a gas pocket in the stand pipe; and testing the gas in the stand pipe for gasified refrigerant. The foregoing method may further comprise the additional steps of detecting the volume of the gas pocket in the stand pipe and injecting non-halogen air into the stand pipe. The foregoing method may further comprise the step of mixing the gas in the stand pipe. The mixing step may further comprise continually changing the volume of the gas pocket.

Also to achieve the foregoing objects, there is disclosed an apparatus for detecting refrigerant leaks in a refrigeration system having a refrigerant and a heat exchanging fluid comprising a heat exchanger having a conduit therethrough for transporting a heat exchanging liquid; a stand pipe in communication with the conduit; means for detecting a volume of gas in the stand pipe; means for injecting gas into the stand pipe; means for detecting gasified refrigerant in a gas pocket within the stand pipe; and a sample tube disposed within the stand pipe, the sample tube in communication with the gasified refrigerant detector means. The sample tube may be perforated. The means for detecting a volume of gas in the stand pipe may comprise a fluid-level detecting means. The fluid-level detecting means may comprise a float switch. The float switch may be disposed within a protective housing.

Also to achieve the foregoing objects there is disclosed a method for detecting gasified refrigerant within a conduit carrying a liquid comprising the steps of exposing a liquid in a conduit to a stand pipe in communication with the conduit; establishing a gas pocket in the stand pipe, which gas pocket extends into the conduit; and testing the gas in the stand pipe for gasified refrigerant. The foregoing method may include the further step of drawing the gas through a sample tube disposed within the stand pipe. The foregoing method may have the additional step of continually changing the volume of the gas pocket.

Also to achieve the foregoing objects, there is disclosed a method for detecting gasified refrigerant within a conduit carrying a liquid comprising the steps of exposing a liquid in a conduit to a stand pipe in communication with the conduit; establishing a gas pocket in the stand pipe; drawing the gas through a sample tube disposed within the stand pipe; and testing for gasified refrigerant the gas drawn through the sample tube. The foregoing method may have the additional step of continually changing the volume of the gas pocket. The sample tube may be perforated.

DETAILED DESCRIPTION OF THE INVENTION AND PREFERRED EMBODIMENT

The present invention is particularly useful in detecting halogen gas in the flow of a liquid. For purposes of illustration, the invention will be described herein as a Freon leak detector system for a chiller having heat exchangers within a condenser and an evaporator.

Figure 1:
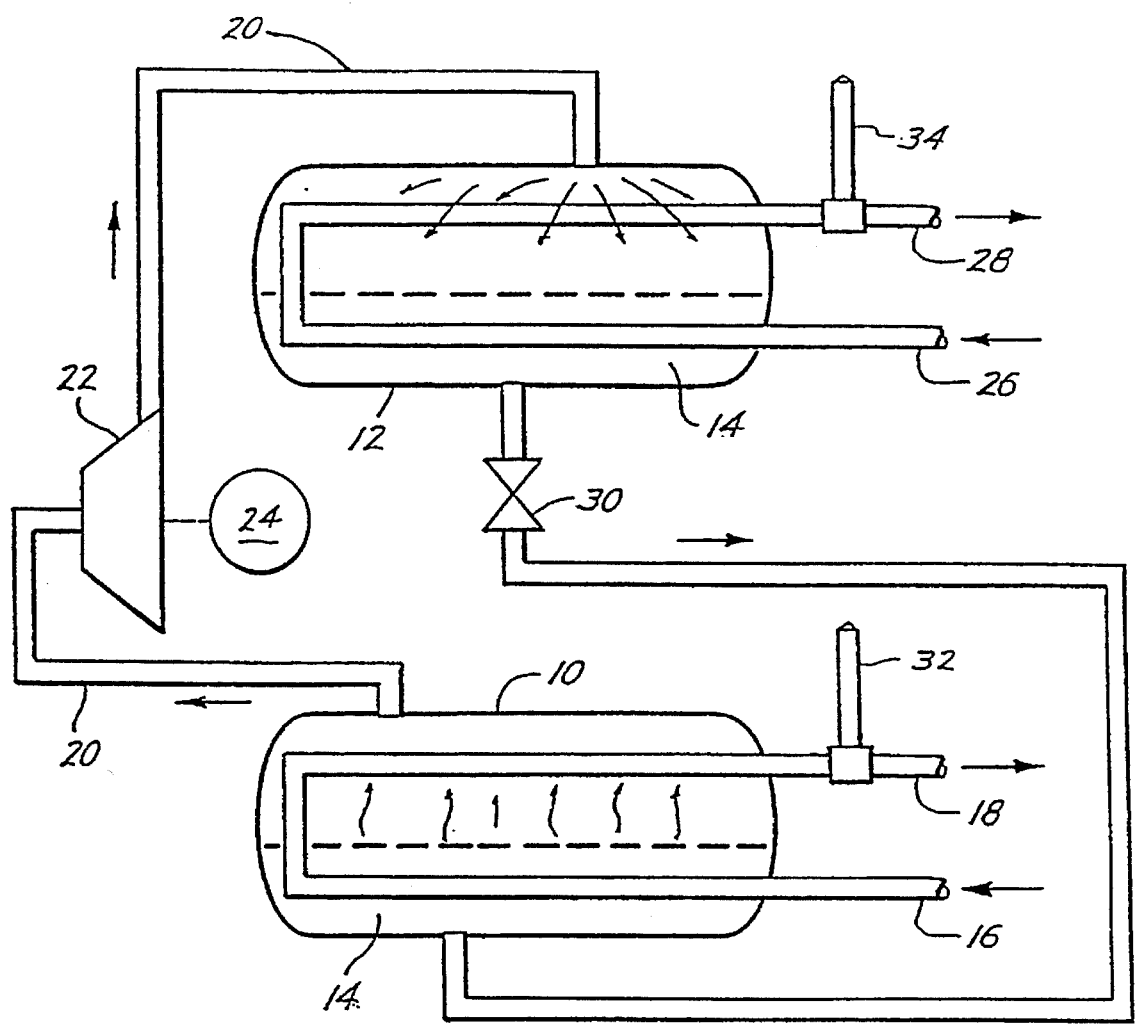
FIG. 1 depicts a schematic of a chiller system employing the claimed invention.

Referring now to the drawings, particularly FIG. 1, a chiller employing the present invention has an evaporator 10 and condenser 12. The evaporator 10 and condenser 12 each comprise a tube-side and shell-side heat exchanger system, the likes of which are well known to those skilled in the relevant art. The inside walls of the evaporator 10 and condenser 12 serve as the "shell side" of the heat exchanger system, through which run smaller pipes (not shown) that serve as the "tube side" of heat exchanger system.

The evaporator 10 contains Freon in its shell side. A first heat exchanging liquid 16, of warm temperature, of which pure water or glycol in an aqueous solution are preferred, is pumped through the tube side of the evaporator 10. The liquid Freon 14 cools the first heat exchanging liquid 16 and is gasified by the heat of the first heat exchanging liquid 16, whereby the liquid Freon 14 changes phase to Freon gas 20. The first heat exchanging liquid 16 emerges from the evaporator 10 as chilled heat exchanging liquid 18, which can be used for numerous useful purposes such as air conditioning, industrial cooling, and the like.

The gasified Freon 20 is compressed to a higher pressure by a compressor 22, driven by a motor 24, and pumped into the shell side of the condenser 12. The increase in pressure generally increases the temperature of gasified Freon 20.

A second heat exchanging liquid 26, of cool temperature, of which water is preferred, is pumped through the tube side of the condenser 12. The second heat exchanging liquid 26 cools the gasified Freon 20 and is heated by the gasified Freon 20. The second heat exchanging liquid 26 emerges from the condenser 12 as heated heat exchanging liquid 28. At the elevated pressure of the condenser 12, the cooling of the gasified Freon 20 by the second heat exchanging liquid 26 is sufficient to cause the gasified Freon 20 to change phase back to liquid Freon 14. The liquid Freon 14 within the condenser 12 is forced through an expansion valve 30. As the liquid Freon 14 is forced through the expansion valve 30, the liquid Freon 14 further cools and again enters the evaporator 10, where the refrigeration cycle is repeated.

The present invention provides for stand pipes 32 and 34 placed in communication with conduits carrying the exiting heat exchanging fluids 18 and 28. Each of the stand pipes comprise identical apparatus.

Figure 2:
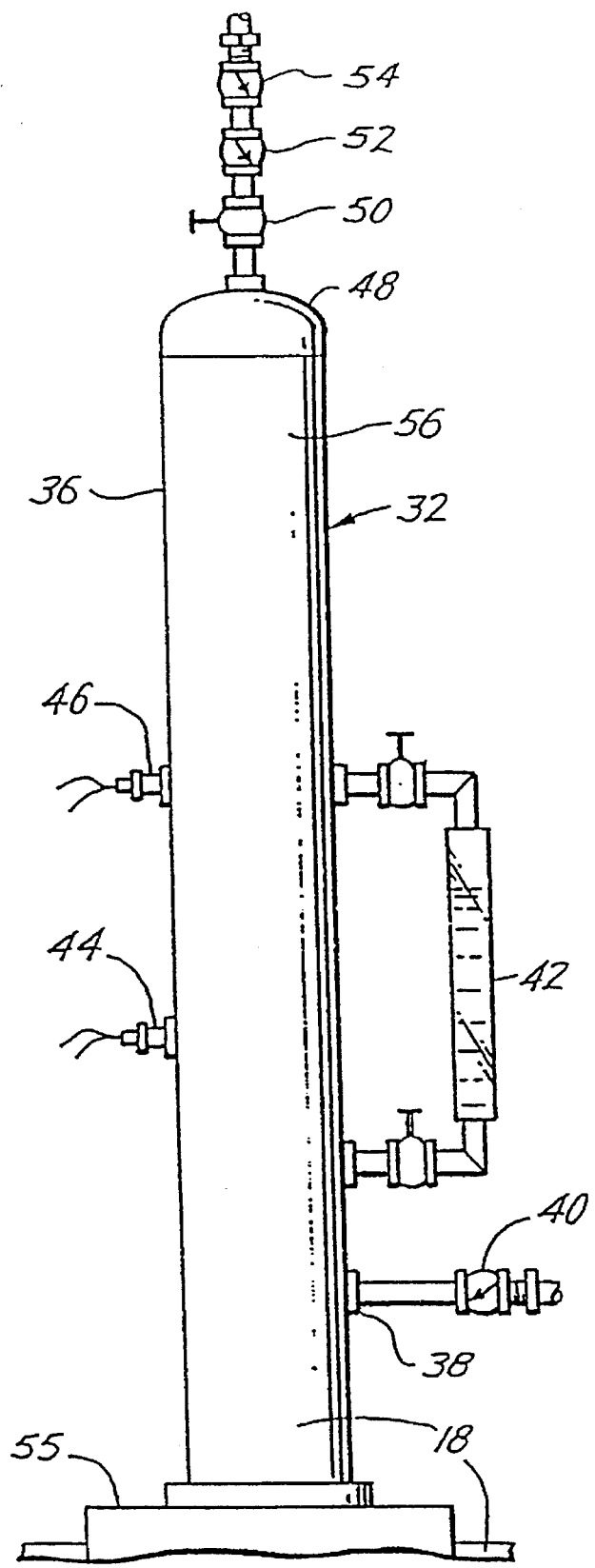
FIG. 2 depicts a front view of a stand pipe according the claimed invention.

FIG. 2 depicts stand pipe 32, which is identical to stand pipe 34. Stand pipe 32 comprises a pipe 36 and an air injection conduit 38 having a first check valve 40. The stand pipe 32 has a standard sight level gauge 42 and liquid level float switches 44 and 46. The top of the stand pipe 32 has a dome 48, a shut-off valve 50, and a series of second and third check valves 52 and 54.

The base 55 of the stand pipe 32 is in communication with the conduit carrying the exiting heat exchanging fluid 18. The heat exchanging fluid 18 rises in the stand pipe 32 in response to the pressure of a vapor pocket 56 and the pressure of the heat exchanging fluid 18. The volume of the vapor pocket 56 is controlled by the float switches 44 and 46. If the level of the heat exchanging fluid 18 rises to the level of the float switch 46, float switch 46 activates means for pumping ambient air through ambient air injection conduit 38, which increases the pressure of the vapor pocket 56 and causes the level of the heat exchanging fluid 18 to fall. If the level of the heat exchanging fluid drops to the level of the float switch 44, float switch 44 activates means for drawing gas from the vapor pocket 56 through the shut-off valve 50, which decreases the pressure of the vapor pocket 56 and causes the level of heat exchanging fluid 18 to rise. The sight level gauge 42 is made of clear glass or clear plastic and permits an operator to view the actual level of the heat exchanging fluid 18 without opening the stand pipe 32.

Check valves 40, 52, and 54 are for safety. Specifically, check valve 40 prevents the heat exchanging fluid 18 from flooding into the ambient air source. Check valves 52 and 54 provide in series a means for keeping the heat exchanging fluid 18 from passing through the shut-off valve 50.

Figure 3:
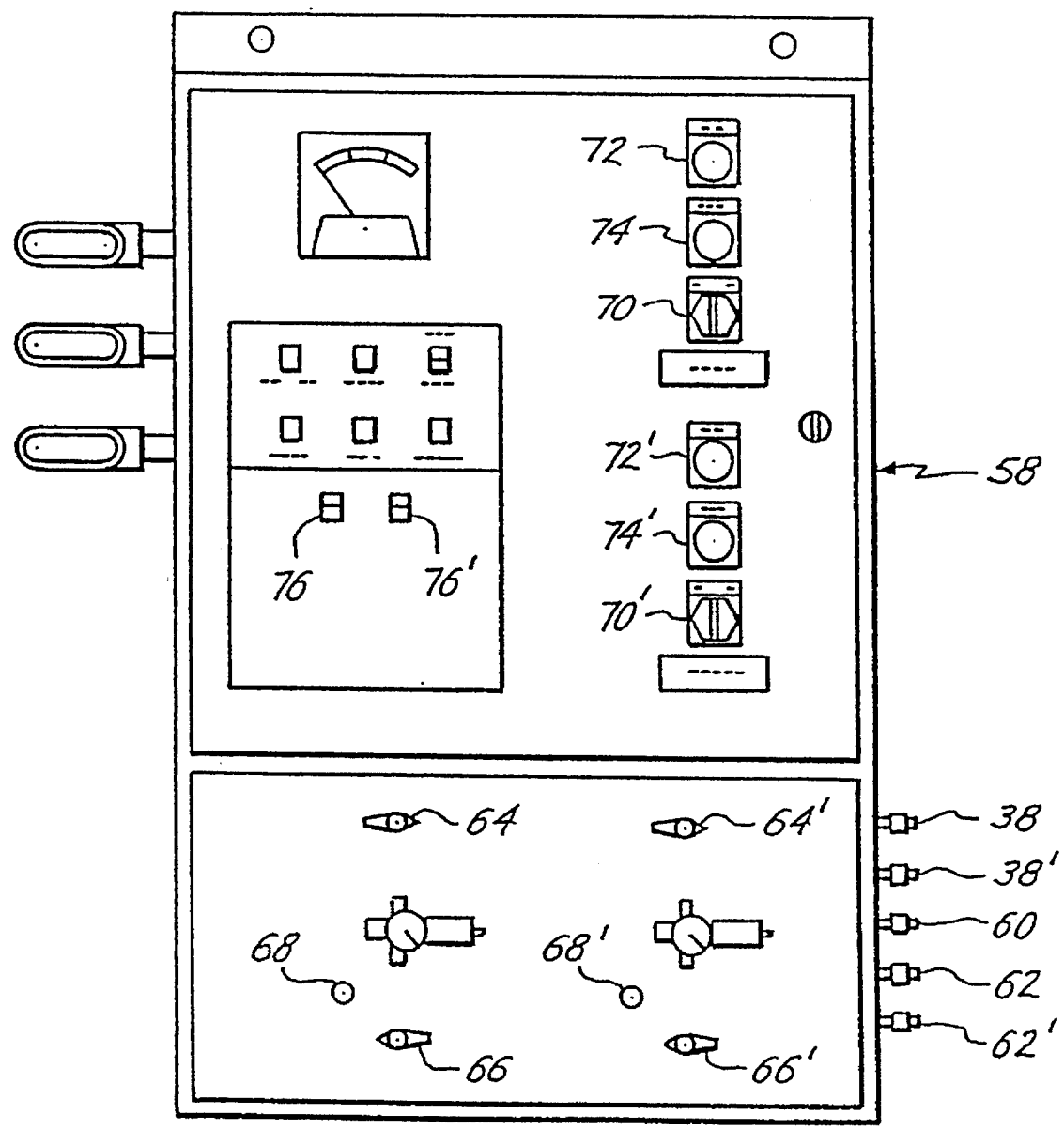
FIG. 3 depicts a front view of a control board and halogen tester employed by the claimed invention.

FIG. 3 depicts a typical embodiment of a control board and halogen tester 58 for use with the claimed invention. Parts relating specifically to stand pipe 34 and corresponding to identical parts relating to stand pipe 32 are identified in FIG. 2 by corresponding prime numbers. The control board and halogen tester 58 has an air input conduit 60. When activated by the switch 46, air is drawn into the air input conduit 60 and injected in the stand pipe 32 through injection conduit 38. Gas from the vapor pocket 56, drawn through the shut-off valve 50, is injected into the control board and halogen tester 58 through gas input 62. The control board and halogen tester 58 has bleed switches 64 and 66 for controlling the check valves 52 and 54. The control board and halogen tester 58 also has a bleed valve 68 for bleeding from the tester 58 any unwanted gas drawn through the gas input 62. Panel switch 70 activates the float switches 44 and 46 to make them responsive to the level of heat exchanging fluid 18 in the stand pipes 32. Lights 72 and 74 indicate whether float switches 44 and 46 have been so activated. In the event that the halogen tester 58 detects a pre-determined level of Freon gas, alarm light 76 is activated.

In operation, Freon may leak within either the condenser 12 or the evaporator 10. Because the Freon is at all times under much more pressure than the heat exchanging fluid, the Freon will escape into the flow of the heat exchanging fluid where the Freon will quickly gasify. Thus, for example, Freon leaks within the heat exchanger of the evaporator 10 will cause gasified Freon to appear in the exiting flow of heat exchanging fluid 18.

Heat exchanging fluid 18 is cycled through the stand pipe 32 at a suitable pressure readily determined by those skilled in the art. Any gasified refrigerant in the heat exchanging fluid 18 will rise into the vapor pocket 56. Gasified refrigerant is much heavier than ambient air. Thus, any gasified refrigerant will tend to gather at the bottom of the vapor pocket 56. To lift the gasified refrigerant to the shut-off valve 50, it is possible to mix and to homogenize the vapor pocket 56 with bubbles of gas injected through the injection conduit 38. In such an embodiment, the stand pipe 32 acts as a "lung" as the level of the heat exchanging fluid 18 is caused to rise and fall at a constant predetermined rate between the float switches 44 and 46. Each time the vapor pocket 56 expands, bubbles of ambient air from the ambient air injection conduit 38 pop on the surface of the heat exchanger fluid 18, thus continually mixing the vapor pocket 56. It is also possible without constantly changing the level of the heat exchanging fluid 18 to mix and to homogenize the vapor pocket 56 by means such as a fan within the stand pipe (not shown). It is also possible without mixing and homogenizing the vapor pocket 56 to take halogen gas samples from the bottom of the vapor pocket 56, using such means as a sample tube extending from the shut-off valve 50 to the bottom of the vapor pocket 56.

As gas from the vapor pocket 56 is drawn through the shut-off valve 50, the gas is tested by the control board and halogen tester 58 in a manner well known to those skilled in the art.

Figure 4:
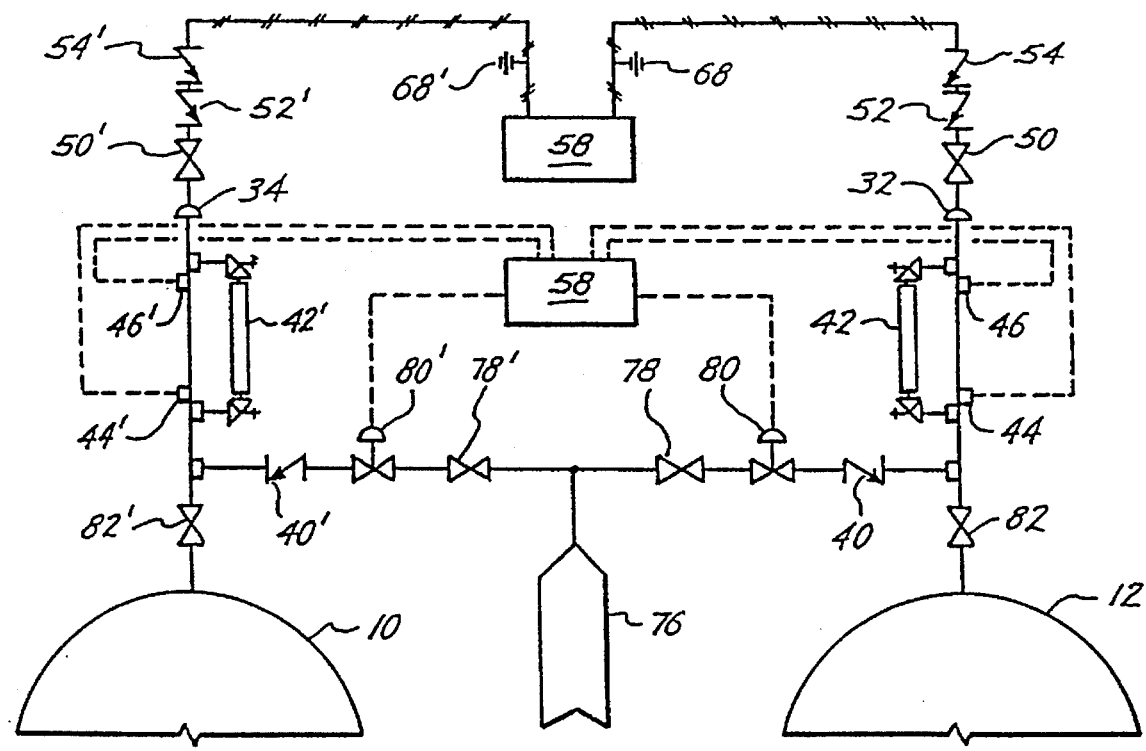
FIG. 4 depicts a flow diagram of a system in accordance with the claimed invention.

FIG. 4 depicts a flow diagram of the system described in FIGS. 2 and 3. Parts relating specifically to stand pipe 34 and corresponding to identical parts relating to stand pipe 32 are identified in FIG. 4 by corresponding prime numbers. The preferred embodiment of the claimed invention contemplates a plant pressurized air source 76 at a pressure of 100 psig. The appropriate pressure of the heat exchanging fluid 18 is readily determined by those skilled in the relevant art. Air from the air source 76 passes through a manual isolation valve 78 and a first solenoid check valve 80, which is activated and deactivated by signals from the float switches 44 and 46 which are processed by the control board 58, and a first check valve 40. Heat exchanging fluid 18 leaves the condenser 12 and enters the stand pipe 32 through an isolation valve 82. Gas from the stand pipe 32 passes through the shut-off valve 50 into the control board halogen and tester 58, where the gas is detected.

Figure 5:
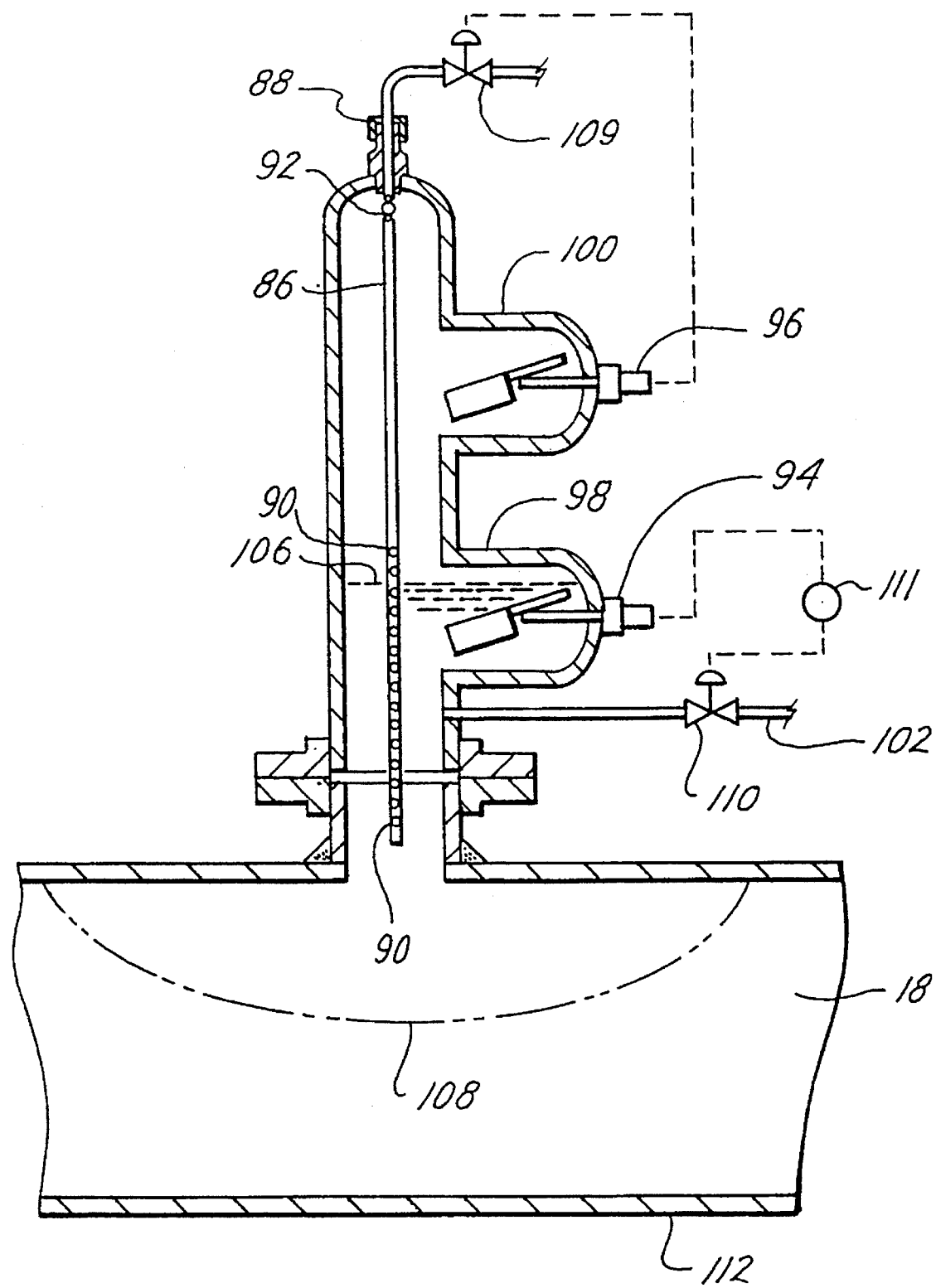
FIG. 5 depicts an alternative embodiment of the stand pipe depicted in FIG. 2.

FIG. 5 depicts a presently preferred embodiment of the stand pipes 32 and 34. Stand pipe 84 is in communication with heat exchanger fluid conduit 112. Stand pipe 84 includes a perforated sample tube 86 connected to a fitting 88 in communication with a solenoid valve 109. The perforated sample tube 86 has sampling perforations 90 and emergency perforations 92. Stand pipe 84 has a single operating float switch 94 and an emergency float switch 96. The float switches are housed in protective housings 98 and 100.

In stand pipe 84, ambient air is injected through air injection conduit 102 to expand the vapor pocket 56 from a high heat exchanging fluid level 106, as determined by float switch 94, to a low heat exchanging level 108. The heat exchanging fluid level 108 is controlled by limiting the amount of ambient air injected through air injection conduit 102 once the level of the heat exchanging fluid 18 triggers the float switch 94. The preferred means of limiting the amount of ambient air injected through air injection conduit 102 is air injection solenoid 110, which is controlled by a timing relay 111.

Once the low heat exchanging fluid level 108 is reached, gas from the vapor pocket 56 is drawn, unmixed, through the sampling perforations 90 and emergency perforations 92. The drawn gas from the vapor pocket 56 passes through the solenoid valve 109 and into the control board and halogen tester 58. Because of the number of sampling perforations 90, gas from the vapor pocket 56 is drawn principally from the sampling perforations 90.

Experiments have shown that using a sample tube, such as sample tube 86, provides more accurate halogen gas readings than does mixing the vapor pocket 56. Since halogen gas is much more heavy than ambient air, it is believed that halogen gas within the vapor pocket 56 settles to the bottom of the vapor pocket 56 and is drawn through the sampling perforations 90 into the control board and halogen tester 58. Thus, the gas sampled from stand pipe 84 reflects a higher concentration of halogen gas than does the mixed gas sampled from stand pipe 32 depicted in FIG. 2.

In the preferred embodiment of the sample tube 86, emergency perforations 92 serve to prevent heat exchanger fluid 18 from being sucked through the sample tube 86, through the solenoid valve 109, and into the control board and halogen tester 58, in the emergency event that the high heat exchanger fluid level 106 rises above the highest perforation of the sampling perforations 90. Emergency float level switch 96 can serve as a mechanism for warning of an excessive level of heat exchanging fluid 18 within the stand pipe 84.

In the preferred embodiment of the stand pipe 84, the sampling perforations 90 are about 3/16" in diameter and are spaced about 1/2" apart. The sampling perforations are preferably only as high along the sampling tube 86 to permit sampling of the gas pocket 56 through the highest sampling perforations 90 when the heat exchanging fluid reaches the high heat exchanger fluid level 106.

The stand pipes may be placed at any point in the chiller system through which heat exchanger fluid flows. For example, the stand pipes may be placed in communication with conduits carrying heat exchanging fluid. It is desirable that the vapor pocket 56, as depicted in FIG. 5, be driven into, and caused to expand into, a heat exchanging fluid conduit such as heat exchanging fluid conduit 112. Such expansion of the vapor pocket 56 is reflected by the low heat exchanging fluid level 108 in FIG. 5.

The expanded vapor pocket 56 reflected by the low heat exchanging fluid level 108 is desirable because such an expanded vapor pocket increases the surface area of the heat exchanging fluid 18 from which halogen gas might enter into the vapor pocket 56 for detection. Accordingly, it is desirable to make the expansion of the vapor pocket 56 into the heat exchanging fluid conduit 112 to be as large as possible without causing the vapor pocket 56 to be washed through the conduit 112 by the flowing heat exchanging fluid 18. Such a volume can be determined for a particular apparatus by experimentation by one skilled in the art. To affect such large expansion, it is desirable to place the stand pipe 84 over a high point in the heat exchanging fluid circulation system, where vapor naturally accumulates. It is preferred that the stand pipe 84 be placed over the water box (not shown), which is the chambered end of the heat exchanger in which tube-side heat exchanger fluid is collected.

Heat exchanger fluid 18 moves rapidly and with substantial force through the heat exchanger fluid conduit 112. Thus, it is desirable that the sampling tube 86 not extend substantially into the heat exchanger fluid conduit 112 so as to prevent the sampling tube 86 from being broke by the force of the flowing heat exchanger fluid 18.

In operation, the heat exchanging fluid 18 may travel rapidly and with substantial force between heat exchanging fluid levels 108 and 106. Such force may damage or break the sampling tube 86 or the float switches. Thus, it is desirable that the sampling tube 86 be made of durable material, of which stainless steel or copper is preferred. The float switches 94 and 96 may be protected from the force of the heat exchanging fluid 18 by protective housings, such as 98 and 100. Protective housings 98 and 100 shield the float switches 94 and 96 from violent uprisings of the heat exchanging fluid 18 as it travels upward into the stand pipe 84.

It is to be understood that the foregoing description is of the presently preferred embodiment. Notwithstanding the preferred embodiment, the invention can be used to detect any halogen gas in the flow of a liquid, and the invention can be used with or without a chiller. "Stand pipe" is intended to encompass any chamber that affects formation of a closed vapor pocket over the surface of a liquid and from which gas samples may be taken. "Halogen" is intended to mean any gas molecule comprising a halogen atom.

We claim:

1. An apparatus for detecting refrigerant leaks in a refrigeration system having a refrigerant and a heat exchanging fluid comprising:

a heat exchanger having a conduit therethrough for transporting a heat exchanging liquid;

a stand pipe in communication with the conduit;

means for detecting a volume of gas in the stand pipe;

means for injecting gas into the stand pipe;

means for detecting gasified refrigerant in a gas pocket within the stand pipe; and a sample tube disposed within the stand pipe, the sample tube in communication with the gasified refrigerant detector means.

2. The apparatus of claim 1 in which the sample tube is perforated.

3. The apparatus of claim 1 in which the means for detecting a volume of gas in the stand pipe comprises a fluid-level detecting means.

4. The apparatus of claim 3 in which the sample tube is perforated.

5. The apparatus of claim 3 in which the fluid-level detecting means comprises a float switch.

6. The apparatus of claim 5 in which the float switch is disposed within a protective housing.

7. A method for detecting gasified refrigerant within a conduit carrying a liquid comprising the steps of:

exposing a liquid in a conduit to a stand pipe in communication with the conduit;

establishing a gas pocket in the stand pipe, which gas pocket extends into the conduit; and testing the gas in the stand pipe for gasified refrigerant.

8. The method of claim 7 having the further step of drawing the gas through a sample tube disposed within the stand pipe.

9. The method of claim 7 having the further step of continually changing the volume of the gas pocket.

10. A method for detecting gasified refrigerant within a conduit carrying a liquid comprising the steps of:

exposing a liquid in a conduit to a stand pipe in communication with the conduit;

establishing a gas pocket in the stand pipe;

drawing the gas through a sample tube disposed within the stand pipe; and testing for gasified refrigerant the gas drawn through the sample tube.

11. The method of claim 10 having the additional step of continually changing the volume of the gas pocket.

12. The method of claim 10 in which the sample tube is perforated.

* * * * *